United States Patent [19]
Lemme

[11] Patent Number: 4,513,358
[45] Date of Patent: Apr. 23, 1985

[54] LAMP COMPRISING AUTOMATICALLY ACTUATED LOUVER SYSTEM

[75] Inventor: Charles D. Lemme, Tucson, Ariz.

[73] Assignee: Blazer International Corp., Franklin Park, Ill.

[21] Appl. No.: 510,207

[22] Filed: Jul. 1, 1983

[30] Foreign Application Priority Data

Sep. 21, 1982 [JP] Japan ............................ 57-141917

[51] Int. Cl.³ .............................................. F21V 17/02
[52] U.S. Cl. .................................... 362/276; 362/279; 362/290; 362/324; 362/325
[58] Field of Search ........................ 362/61, 80, 83, 92, 362/277, 279, 280, 281, 290, 294, 295, 324, 325, 373, 276; 236/1 G

[56] References Cited
U.S. PATENT DOCUMENTS

| | | |
|---|---|---|
| 1,037,402 | 9/1912 | Zehendner . |
| 1,204,888 | 11/1916 | Large . |
| 1,263,080 | 4/1918 | Leonard . |
| 1,518,012 | 12/1924 | Smith .................................. 362/279 |
| 1,684,720 | 9/1928 | Wagner . |
| 1,861,752 | 6/1932 | Patterson . |
| 2,060,427 | 11/1936 | Robinson . |
| 2,224,726 | 12/1940 | Finnegan, Jr. et al. . |
| 2,423,322 | 7/1947 | Hurley, Jr. . |
| 2,556,870 | 6/1951 | Clark . |
| 3,275,820 | 9/1966 | Szarkowski . |
| 3,548,186 | 12/1970 | Brock . |
| 3,555,264 | 1/1971 | Schimmelpfennig . |
| 3,883,885 | 5/1975 | Orlando . |
| 3,922,591 | 11/1975 | Olsen . |
| 4,284,235 | 8/1981 | Diermayer ......................... 236/1 G |
| 4,441,144 | 4/1984 | Horiuchi et al. . |

FOREIGN PATENT DOCUMENTS

| | | |
|---|---|---|
| 235493 | 3/1910 | Fed. Rep. of Germany . |
| 448653 | 9/1912 | France . |
| 691836 | 10/1930 | France . |
| 1083812 | 1/1955 | France . |
| 2387416 | 4/1977 | France . |
| 165284 | 1/1934 | Switzerland . |
| 289257 | 8/1927 | United Kingdom . |
| 1581805 | 12/1980 | United Kingdom . |

Primary Examiner—Donald P. Walsh
Attorney, Agent, or Firm—Willian Brinks Olds Hofer Gilson & Lione Ltd.

[57] ABSTRACT

A lamp such as a fog lamp for a vehicle is provided with a housing which serves to mount an array of parallel louvers. The louvers are controlled by a heat driven actuator. Such as one which incorporates a shape memory metal actuator element. This actuator element is heated either by resistive heating or by direct heat of the light bulb when the lamp is activated. When heated, the actuator serves to pivot the louvers into an open position. Once the lamp is deactivated, heating of the actuator is terminated, and the louvers are automatically closed to protect the lens by a spring as the actuator cools.

18 Claims, 12 Drawing Figures

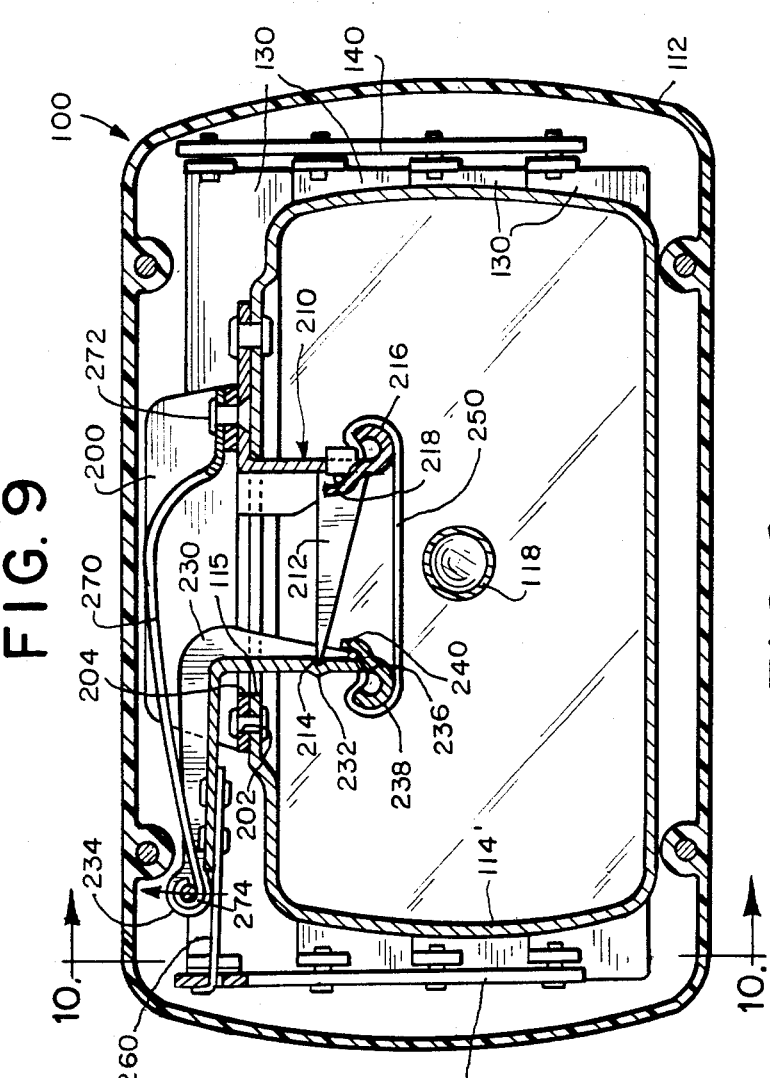
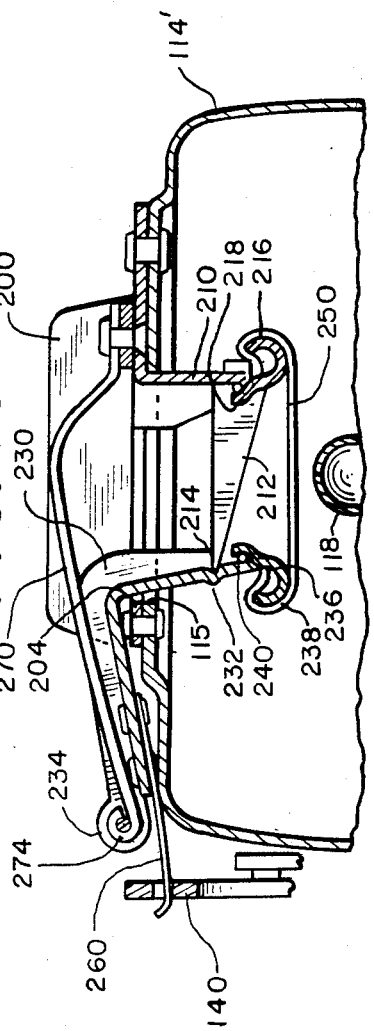
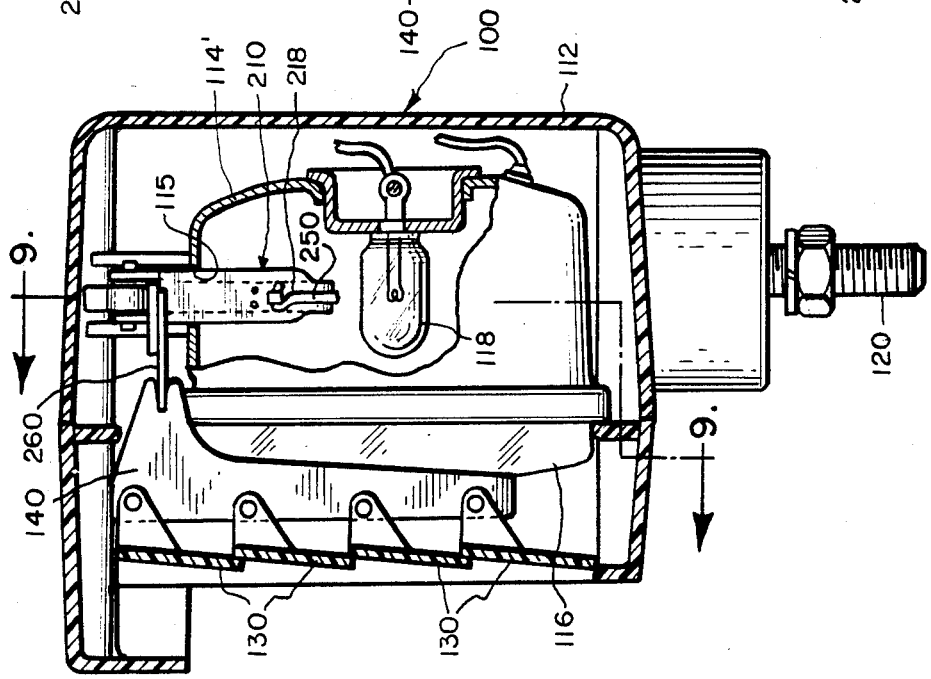

LAMP COMPRISING AUTOMATICALLY ACTUATED LOUVER SYSTEM

BACKGROUND OF THE INVENTION

The present invention relates to an automatically actuated louver system for lamps in which the louver system automatically opens when the lamp is activated, and automatically closes after the lamp has been deactivated.

There is a need in the automotive lamp industry for covers for lamps that will protect the lamp lens from road hazards such as rocks and other material thrown up against the lamp lens.

In the past, such covers have usually taken the form of plastic covers intended to be manually removed from the lamp prior to lamp activation and then manually replaced on the lamp after the lamp has been deactivated. A common problem with this prior art approach is that such covers must be manually removed and then installed. Typically, a vehicle must be stopped and the driver must get out of the vehicle in order to remove or replace such a cover. Furthermore, such covers must be stored somewhere in the vehicle until the time at which they are replaced on the lamps.

A second prior art approach is to utilize a pivoting cover in front of the lamp which is manually pivoted upwardly to expose the lens prior to activation of the lamp and then downwardly over the lens to protect the lens after the lamp has been deactivated. This second prior art approach eliminates problems related to cover storage, but still requires the vehicle to be stopped and the cover to be removed before the lamp can be activated.

A recurring problem with both of these prior art approaches is that if the driver forgets to remove the cover before turning on the lamp, the intense heat of the quartz-halogen bulbs typically used with such lamps can distort and eventually melt such covers, particularly when they are made of plastic.

SUMMARY OF THE INVENTION

The present invention is directed to an improved lamp which includes a louver system, which louver system is automatically closed in order to protect the lamp lens when the lamp is not in use, and automatically opened to reveal the lens when the lamp is activated. The preferred embodiments described below operate automatically without any additional circuitry or switching, they provide excellent protection for the lamp lens when they are closed, and they even provide some degree of protection against impact of large objects against the lens when they are open.

According to this invention, a lamp of the type which includes a lamp housing, a light source, and a lens is provided with a louver system. This louver system is mounted to the housing in front of the lens and is movable between an open position in which the louver system allows light from the light source to be projected forwardly, and a closed position, in which the louver system covers the lens. A heat driven actuator such as an actuator incorporating a shape memory metal is coupled to the mounting means to move the louver system to the open position then heat is applied to the actuator and to move the louver system to the closed position after the light source has been deactivated and the application of heat to the actuator has stopped. Finally, means are provided for automatically heating the actuator when the light source is activated. Typically, a return spring is provided which acts automatically to close the louver system once the heat driven actuator is no longer being heated. In this way, the louver system is automatically opened after the light source is activated, and automatically closed after the light source is deactivated. No detachable covers are needed such as may become lost, and no independent operator activity is required to insure that the lamp lens is protected when the lamp is deactivated and that the louver system is opened after the lamp has been activated.

Of course, the present invention can be readily adapted to lamps in which the louver system is positioned in a frame in front of the lamp. Throughout this specification and the following claims, the term "housing" is used in its broad sense to encompass such frames.

In the following discussion, two preferred embodiments of this invention are described in detail. The first utilizes a resistively heated, heat driven actuator coupled in series with the light source such that the actuator is heated by the same electrical current as that which powers the light source. The second preferred embodiment utilizes a heat driven actuator positioned to absorb heat directly from the light source included in the lamp. Both of these embodiments meet the objects and provide the advantages described above.

The invention itself, together with further objects and attendant advantages, will best be understood by reference to the following detailed description, taken in conjunction with the accompanying drawings.

BRIEF DESCRIPTION OF THE DRAWINGS

FIG. 9 is a cross-sectional view of the embodiment of FIG. 8 taken along line 9—9 of FIG. 10 showing the louvers 130 in the closed position.

FIG. 9a is a cross-sectional view corresponding to FIG. 9 showing the louvers 130 in the open position.

FIG. 10 is a cross-sectional view taken along line 10—10 of FIG. 9.

DETAILED DESCRIPTION OF THE PRESENTLY PREFERRED EMBODIMENTS

Figure 6:
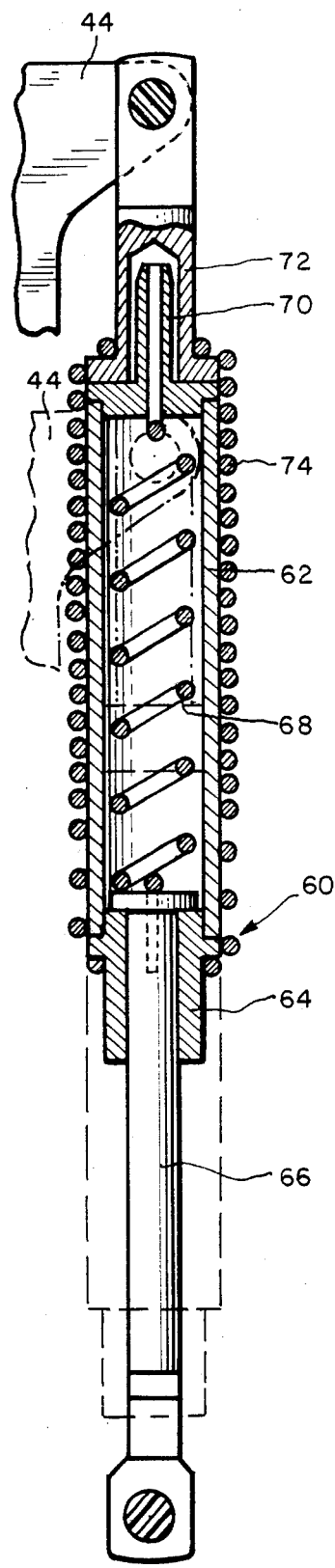
FIG. 6 is an enlarged cross-sectional view of the heat driven actuator included in the embodiment of FIG. 1.
Figure 7:
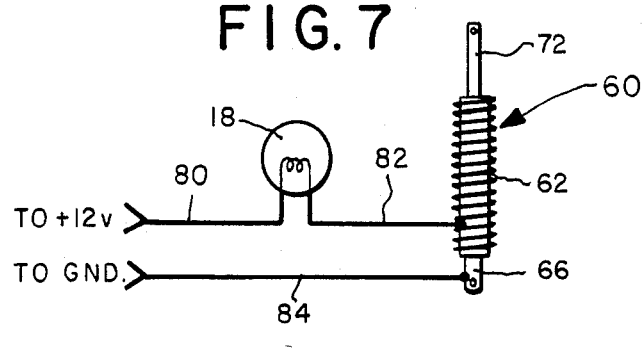
FIG. 7 is a schematic representation of the electrical circuit included in the embodiment of FIG. 1.
Figure 8:
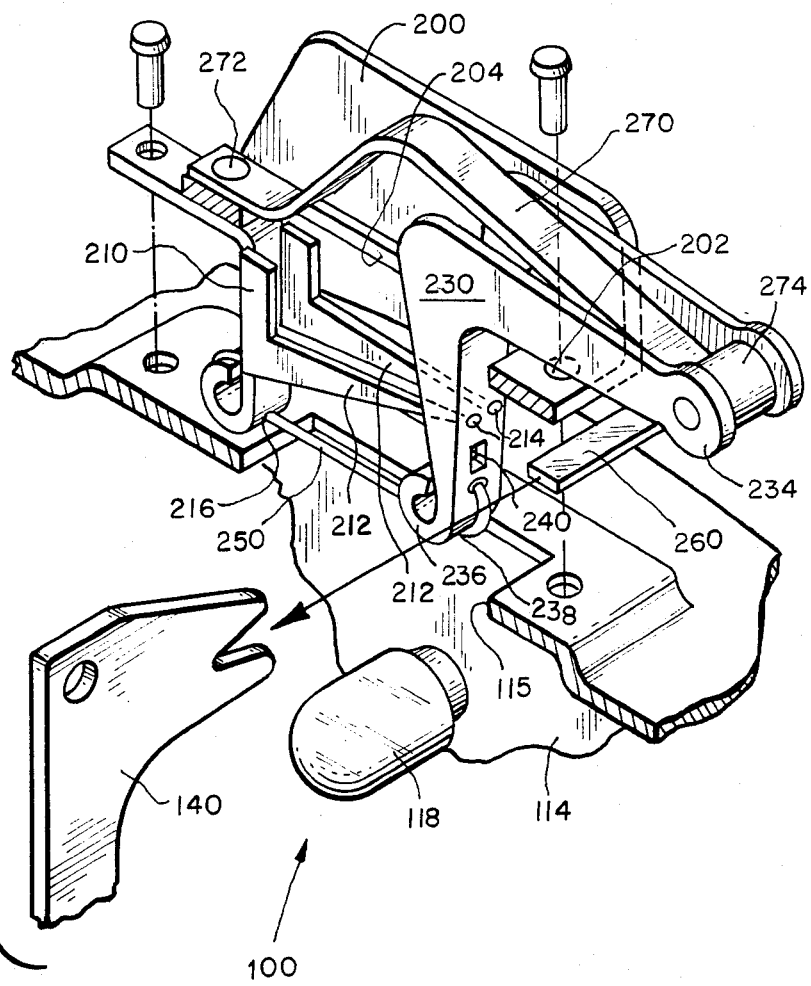
FIG. 8 is an exploded perspective view of portions of a lamp which incorporates a second preferred embodiment of this invention.

Turning now to the drawings, FIGS. 1-7 illustrate a lamp incorporating a first preferred embodiment of this invention, and FIGS. 8-10 illustrate a lamp incorporating a second preferred embodiment of this invention.

Both embodiments utilize a similar housing and louver system, and both embodiments include heat driven actuators for automatically opening the louvers. However, as will become apparent from the following discussion, the heat driven actuators in the two embodiments differ in structure and in operation.

THE FIRST PREFERRED EMBODIMENT

As shown in FIGS. 1–5, the first preferred embodiment 10 includes a housing 12 which substantially encloses a reflector 14 and a lens 16. A light bulb 18 such as a quartz-halogen bulb is mounted to the reflector 14 such that the reflector 14 directs light from the bulb 18 forwardly through the lens 16. The housing 12 supports a mounting post 20 which in practice is used to mount the housing 12 on a vehicle. The portions of the embodiment 10 described above do not depart significantly from standard prior art lamps, such as fog lamps or driving lamps. They will therefore not be described in detail here.

Figure 1:
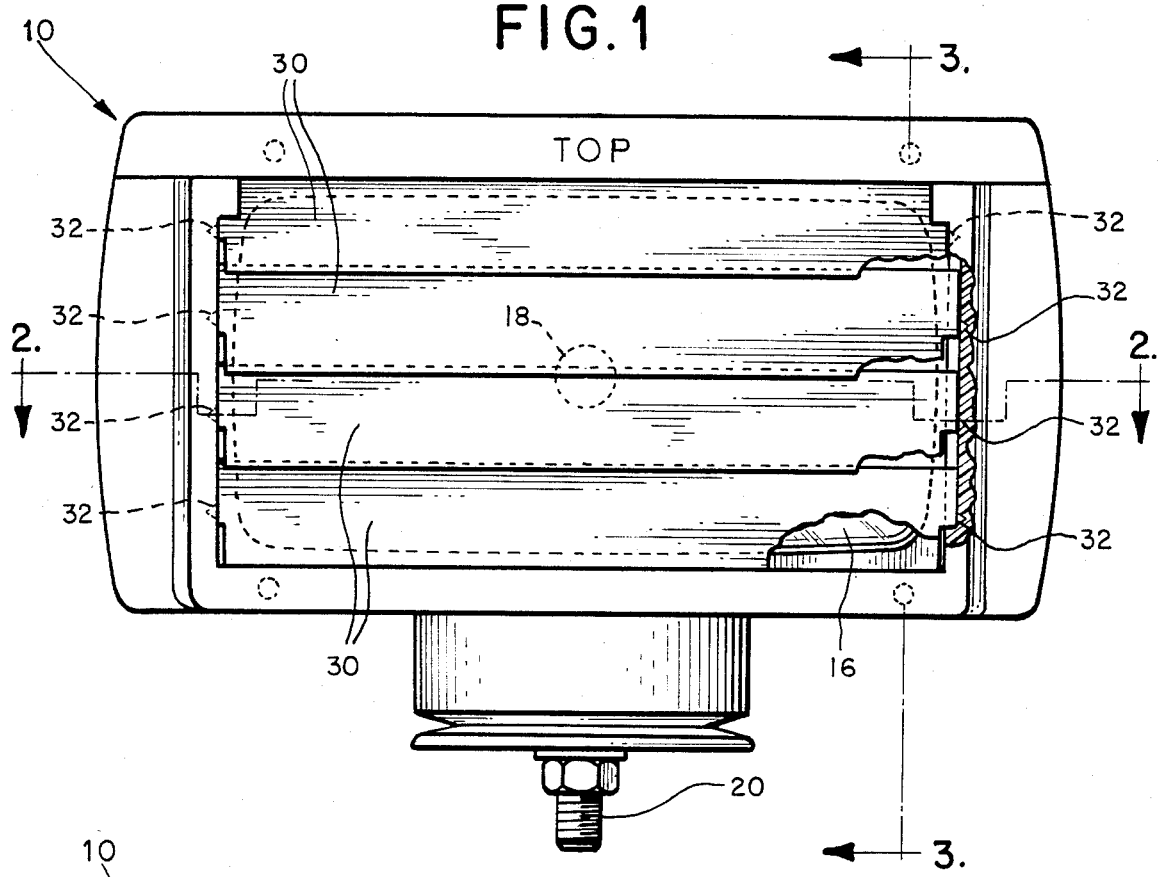
FIG. 1 is a front elevational view of a lamp which incorporates a first preferred embodiment of this invention.
Figure 2:
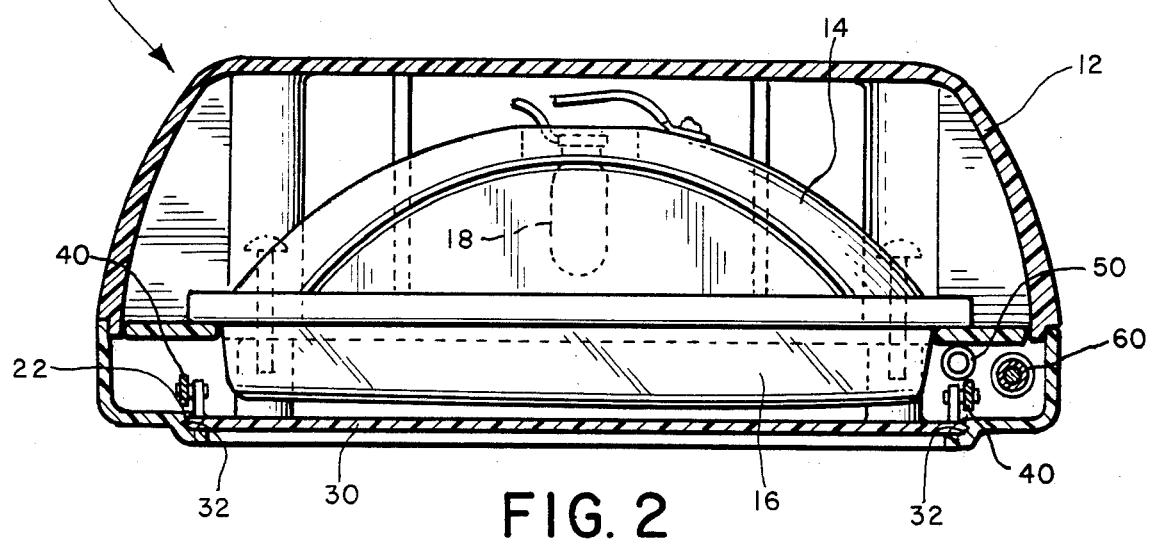
FIG. 2 is a sectional view taken along line 2—2 of FIG. 1.
Figure 1A:
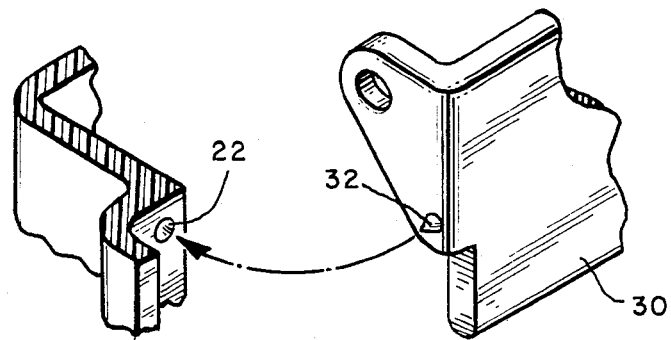
FIG. 1a is a fragmentary exploded perspective view of a part of the embodiment of FIG. 1.
Figure 3:
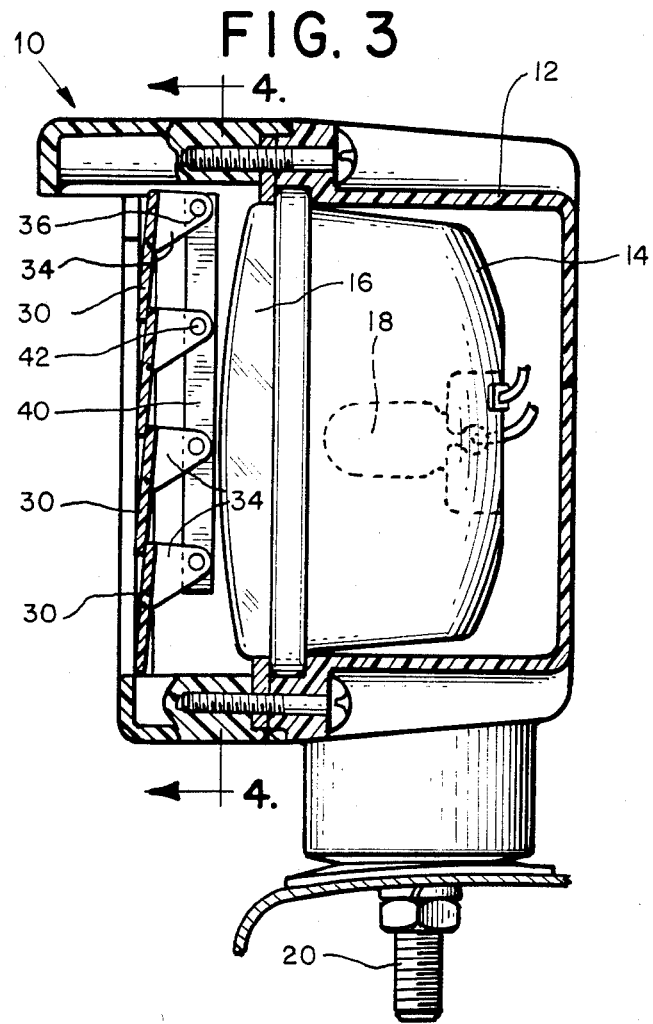
FIG. 3 is a sectional view taken along line 3—3 of FIG. 1 showing the louvers in the closed position.

According to this invention, the housing 12 defines an array of sockets 22 on either side of the front central opening in the housing 12. In this embodiment, four separate louvers 30 are provided, each of which defines a substantially flat central blade. Each louver 30 defines two respective pivot axes 32, one at either end of the louver 30. As shown in FIGS. 1 and 1a, these pivot axes 32 are preferably oriented symmetrically across the width of each louver 30 such that each louver 30 is both gravitationally and aerodynamically balanced about the pivot axes 32. Furthermore, each louver 30 defines an arm 34, as shown in FIG. 3, extending perpendicular to the blade of the louver 30. Each arm 34 defines a respective opening 36 at a point spaced from the plane of the blade.

Figure 5:
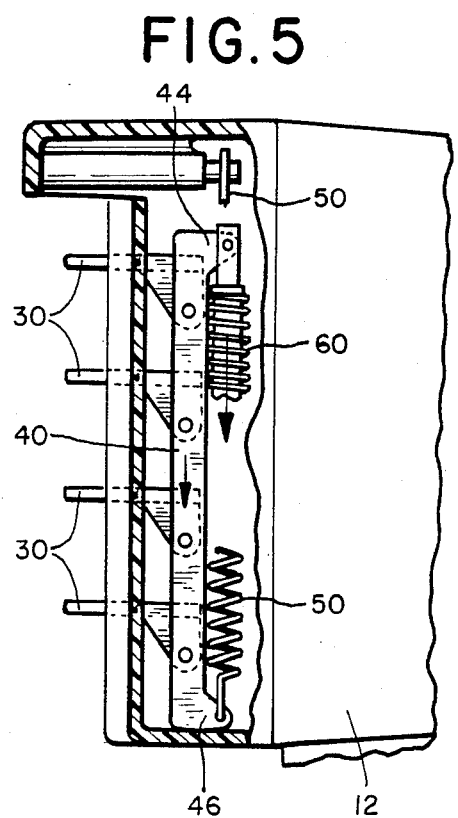
FIG. 5 is a sectional view taken along line 5—5 of FIG. 4 showing the louvers in the open position.
Figure 4:
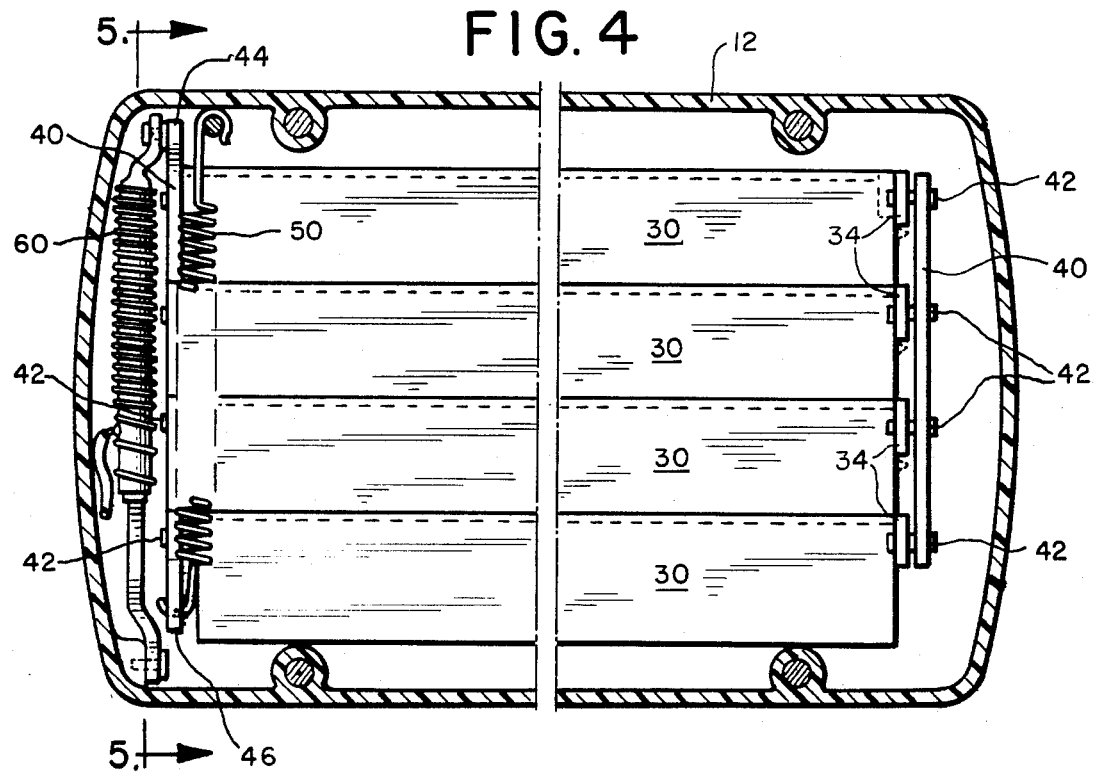
FIG. 4 is a sectional view taken along line 4—4 FIG. 3.

The four louvers 30 are interconnected by a bar 40 which defines four separate pins 42 extending perpendicular to the length of the bar 40. Each of these pins 42 is disposed to pivot in a respective one of the openings 36 defined by the louver arms 34. Thus, each of the louvers 30 is mounted to the housing 12 so as to pivot about a respective pivot axis, and the four pivot axes are parallel and horizontal in the orientation of FIG. 1. As shown in FIGS. 4 and 5, the bar 40 defines an upper plate 44 and a lower plate 46 extending away from the louvers 30.

As the bar 40 moves vertically as shown in FIG. 5, it causes the louvers 30 to move from the closed position shown in FIG. 3 to the open position as shown in FIG. 5. In the closed position the louvers substantially mask and protect the lens 16. In the open position, the louvers present a minimum cross-sectional dimension to light passing from the bulb 18 through the lens 16. However, even in the open position, the louvers 30 provide a certain degree of protection to the lens 16 against stones and other materials.

As best shown in FIG. 4, a coil spring 50 is provided which is mounted at its upper end to the housing 12 and at its lower end to the lower plate 46. The spring 50 serves to bias to the bar 40 upwardly, and thereby to bias the louvers 30 into the closed position shown in FIG. 3. Simply by way of illustration and not limitation, the spring 50 in this embodiment is provided with a free length of 1.8 inches, an installed length with the louvers closed of 2.3 inches, and a stretched length with the louvers open of 2.8 inches. The spring force exerted by the spring 50 when the louvers were in the closed position is 0.8 lbs. The spring constant of the spring 50 of this illustrative embodiment is 0.8 lbs per inch and 40 active turns are included in the spring 50. The mean coil diameter of the spring 50 of this illustrative embodiment is 0.30 inches, and it is formed of wire of 0.028 inches diameter.

The embodiment 10 of FIGS. 1–7 also includes a heat driven actuator 60. As shown in FIG. 4, this actuator 60 is coupled between the housing 12 at its lower end and the upper plate 44 of the bar 40 at its upper end. The heat driven actuator 60 relaxes at low temperatures (below about 160° F.) to allow the spring 50 to close the louvers 30. However, when the actuator 60 is heated, it exerts a biasing force tending to move the bar 40 downwardly, thereby overcoming the biasing force of the spring 50 and pivoting the louvers 30 to the open position.

FIG. 6 shows a cross-sectional view of the heat driven actuator 60. As shown in FIG. 6, the actuator 60 includes a cylindrical tube 62 which is provided at one end with a guide bushing 64. A connecting rod 66 is guided by the guide bushing 64 so as to reciprocate in the tube 62 along a direction of motion parallel to the longitudinal axis of the tube 62. A wire coil 68 is mounted within the tube 62 at one end to the connecting rod 66. At the other end, this wire coil 68 is mounted to an anchor plug 70 which is statically mounted at the end of the tube 62 opposed to the guide bushing 64. A mounting rod 72 is positioned over the anchor plug 70 so as to abut the anchor plug 70. The mounting rod 72 is however not secured to the anchor plug 70 other than by an overload spring 74 which is disposed around the exterior of a tube 62 and is coupled at one end to the guide bushing 64 and at the other end to the mounting rod 72.

In this preferred embodiment, the overextension protection spring 74 preferably has a high initial tension so that it does not normally stretch at all but also a low rate of tension increase so that when the spring does start to stretch its load increases as slowly as possible. Purely by way of example and not by way of limitation, in this preferred embodiment the spring 74 provides a spring force at 2.2 inches of 1.2 lbs and a spring rate of 0.9 lbs. per inch.

Turning to FIG. 5, the mounting rod 72 is secured to the upper plate 44 of the bar 40, and the connecting rod 66 is secured to the housing 12.

The wire coil 68 is formed of a shaped memory metal (SMM) such as NITINOL, a nickel-titanium alloy in nearly equal amounts in which small amounts of other metals such as copper or niobium are provided to enhance fatigue life. In this embodiment, the wire coil 68 is formed of a wire 0.029 inches in diameter, with a mean coil diameter of 0.13 inches and four active coils. In this coil 68, the maximum extension travel is 0.8 inches, the maximum load is 1.5 pounds, and the free length (inside loops) is 0.38 inches.

A shape memory metal such as NITINOL has a characteristic martinsitic state at lower temperatures where its modulus of elasticity is low. In this state it can easily be deformed to a large strain, on the order of a few percent, with a relatively small force. At some characteristic higher temperature or range of temperatures, the shape memory metal changes to an austinetic state in which the modulus of elasticity is much higher. Because of this increased modulus, a previously strained piece of shape memory metal will produce a large increase in force and will tend to return to its original shape.

As it is well known to those skilled in the art, the initial shape that the shape memory metal remembers is in many cases determined by restraining the metal in a desired shape and then annealing it at a high temperature, on the order of 900° F. for NITINOL. In this preferred embodiment, the shape memory metal used to form the wire coil 68 has a transition temperature somewhat above ambient temperature, preferably about 160° F. At temperatures above this transition temperature, the wire coil 68 tends to decrease in length, thereby providing a force sufficient to overcome the biasing force of the spring 50 to move the bar 40 downwardly and to open the louvers 30. Then, later, when the temperature of the wire coil 68 falls below the transition temperature, the wire coil 68 relaxes and can readily be stretched, thereby elongating the effective length of the actuator 60 and allowing the spring 50 to raise the bar 40 and close the louvers 30.

As shown in FIG. 7, in this preferred embodiment the actuator 60 is connected in series with the bulb 18. In this embodiment, a first conductor 80 connects a first terminal of the bulb 18 to a 12 volt voltage source such as an automobile battery. A second conductor 82 connects a second terminal of the bulb 18 to the tube 62. A third conductor 84 connects the connecting rod 66 to ground as for example via the mounting post 20. In this embodiment, the tube 62, the anchor plug 70, and the connecting rod 66 are all formed of an electrically conducting material such as brass. The guide bushing 64 is preferably formed of an electrically insulating material such as a plastic in order to ensure that current passing from the conductor 82 to the conductor 84 flows through the wire coil 68.

In view of the foregoing description, it should be apparent that when the bulb 18 is deactivated, no current flows through the wire coil 68, and the spring 50 biases the louvers 30 into the closed position. When the operator activates the bulb 18, current is automatically caused to pass through the wire coil 68, thereby resistively heating the wire coil 68. In this way, the wire coil 68 is automatically heated and, since it is formed of a shape memory material, the heat driven actuator 60 is automatically caused to shorten so as to move the louvers 30 to the open position. As long as the bulb 18 remains activated, the wire coil 68 remains heated, and the louvers remain open. However, as soon as the bulb 18 is deactivated resistive heating of the wire coil 18 stops, and the wire coil 68 begins to cool. As soon as the wire coil 68 cools below its transition temperature, the actuator 60 is extended by the spring 50, which operates to close the louvers 30 automatically.

THE SECOND PREFERRED EMBODIMENT

Turning now to FIGS. 8–10, a second preferred embodiment of this invention will now be described which utilizes a heat driven actuator which is heated directly by the heat of the lamp.

This second embodiment is incorporated in a lamp 100 which includes a housing 112. As before, this housing 112 serves to mount a lamp assembly which incorporates a reflector 114', a lens 116, and a bulb 118. In the second preferred embodiment, the reflector 114' differs from the reflector 14 described above in that the reflector 114' defines an opening 115 at its upper surface. The housing 112 serves to mount a mounting post 120, louvers 130 and a connecting bar 140 which are identical to corresponding elements in the first preferred embodiment described above.

As best shown in FIG. 9, this second preferred embodiment includes a base plate 200 which is mounted to the reflector 114' so as to extend parallel to and above the reflector 114'. This base plate 200 defines an opening 202 suited for mounting the base plate 200 to the reflector 114' as well as a central passage 204.

A pivot bracket 210 is securely and rigidly mounted to the base plate 200 so as to extend through the opening 115 and the reflector 114', into the interior of the reflector 114'. This pivot bracket 210 defines two spaced, parallel pivot bracket plates 212, each of which defines a pointed apex 214. The two apexes 214 together serve to define a pivot axis perpendicular to the plane of FIG. 9. The pivot bracket 212 also defines an attachment point 216 adjacent a clamping tab 218.

A lever arm 230 defines two spaced dimples 232, each of which serves to receive a respective one of the apexes 214. Thus, the lever arm 230 pivots about the axis defined by the apexes 214, and the lever arm 230 pivots in the plane of FIG. 9. Lever arm 230 defines a first end 234 on one side of the pivot axis and a second end 236 on the other side of the pivot axis. This second end 236 defines an attachment point 238 and an adjacent clamping tab 240. A length of a suitable shape memory metal wire 250 is clamped between the two clamping tabs 218, 240 so as to extend between the two attachment points 216, 238, as shown in FIG. 9. Thus, the effective length of the wire 250 determines the angular position of the lever arm 230 with respect to the pivot axis defined by the apexes 214. A flexible steel strip 260 is mounted to the first end 234 of the lever arm 230 to extend between the lever arm 230 and the bar 140 which is secured across the louvers 130. Preferably, the steel strip 260 is suitably flexible such that the strip 260 buckles when excessive forces are applied by the bar 140 to the lever arm 230 in order to avoid the application of excessive forces to the wire 250.

A leaf spring 270 is mounted to the base plate 200 by means of rivets 272. This leaf spring 270 defines a free end 274 which exerts a biasing force on the first end 234 of the lever arm 230 so as to tend to rotate the lever arm 230 clockwise in the plane of FIG. 9 to close the louvers 130 as shown in FIG. 9.

The actuator arrangement of FIG. 9 is arranged such that the leaf spring 270 biases the louvers 130 into the closed position of FIG. 9 and tends to elongate the wire 250. When the bulb 118 is activated, the heat generated by the bulb 118 heats the wire 250. When the wire 250 (which is made of a shape memory metal as described above) is heated above its transition temperature, it contracts, thereby pivoting the lever arm 230 counterclockwise in the plane of FIG. 9 and moving the bar 140 downwardly, as shown in FIG. 9a. In this way, the louvers 130 are automatically opened after the bulb 118 has been activated. Similarly, once the bulb 118 is deactivated, heating of the wire 250 stops. Once the wire 250 cools down below its transition temperature, the leaf spring 270 stretches the wire 250 and automatically closes the louvers 130.

Any of a wide variety of shape memory metals can be used to form the wire 250 and the wire coil 68. For example the shape memory metal marketed by Raychem Corporation under the trade name TINEL has been tested and found suitable. However, it should be understood that the present invention is not limited to the use of any particular shape memory metal.

A wide variety of materials can be used to manufacture the housing and louvers of this invention. Simply by way of example, nylon 6/6 can be used to form the housing, and a similar material impregnated with 30% glass fiber can be used to form the louvers and the connecting bars. The lever arm 230, pivot bracket 210, and base plate 200 of the second preferred embodiment can be formed of 16 gauge galvanized steel for example.

From the foregoing, it should be apparent that two embodiments of improved lamps which incorporate heat driven actuators in order automatically to open louvers in use have been provided. These improved louver actuating systems provide important advantages in that they do not require the use of electrical motors or solenoids. For that reason, problems related to gear reduction systems or special circuitry in order to provide current to close louvers after a lamp has been deactivated are entirely avoided. Furthermore, complications such as those related to limit switches are also avoided.

The improved louver actuating systems of this invention are particularly lightweight and small in size and can be utilized in standard vehicle lamps with little increases in housing dimensions. As described above, the louver actuating systems of this invention can be directly controlled either by bulb current or bulb heat such that no additional switching or control circuitry is needed. Furthermore, the shape memory metal actuators described above provide direct linear actuation without the need for reduction gears. Also, as described above the actuating systems of this invention operate automatically to close the louvers once lamps have been deactivated, without requiring any additional electronic control circuitry. Because the actuators described above operate to maintain the louvers in the open position, no secondary locking mechanism is required to hold the louvers open in use. The embodiment of FIGS. 7-9 above utilizes a small wire situated off axis above the lamp bulb such that little interference with light patterns is provided.

The present invention can readily be adapted to other types of lamp louver systems, such as clamshell systems which utilize two louvers moving in opposite directions to one another, for example. As used herein, the term "louver system" is intended to be interpreted broadly to cover a wide range of systems in which one or more panels are movable between a closed position, in which a lamp is covered, and an open position in which the lamp is revealed.

Of course, it should be understood that a wide variety of changes and modifications to the preferred embodiments described above will be apparent to those skilled in the art. For example, in some applications it may be advisable to position the closing spring on the opposite end of the louvers from the heat driven actuator. Furthermore, bi-metal heat driven actuators may be adapted for use in certain embodiments of this invention. In addition, particular details of structure, materials, and dimensions can readily be modified to suit intended applications. It is therefore intended that the foregoing detailed description be regarded as illustrative rather than limiting, and that it be understood that its is the following claims, including all equivalents, which are intended to define the scope of this invention.

I claim:

1. In a lamp comprising a lamp housing, a light source and a lens, the improvement comprising:
   a louver system;
   means for mounting the louver system to the housing such that the louver system is positioned in front of the lens and is movable between an open position, in which the louver system allows light from the light source to be projected forwardly, and a closed position, in which the louver system covers the lens;
   a heat driven actuator coupled to the louver system to move the louver system to the open position when heat is applied to the actuator and to move the louver system to the closed position after the light source has been deactivated and the application of heat to the actuator has stopped;
   means for automatically heating the actuator when the light source is actuated; and
   a resilient overload protection element coupled between the heat driven actuator and the louver system to transmit louver actuating forces generated by the heat driven actuator to the louver system, said overload protection element having a sufficiently high resistance to distortion to transmit said actuating forces to the louver system and a sufficiently low resistance to distortion to bend and thereby to protect the heat driven actuator from excessive stretching forces transmitted to the overload protection element by the louver system.

2. The invention of claim 1 wherein the heating means comprises:
   means for conducting electrical current to a resistive heater included in the actuator when the light source is activated.

3. The invention of claim 1 wherein the heating means comprises:
   means for mounting a portion of the actuator adjacent the light source such that heat generated by the light source when the light source is activated heats the portion of the actuator.

4. The invention of claim 1 wherein the actuator comprises a temperature sensitive shape memory metal actuator element coupled to the louvers to move the louver system to the open position when heat is applied to the actuator element.

5. In a lamp comprising a lamp housing, a light source and a lens, the improvement comprising:
   an array of louvers;
   means for mounting the louvers to the housing such that the louvers are positioned in front of the lens and are movable between an open position, in which the louvers allow light from the light source to be projected forwardly, and a closed position, in which the louvers cover the lens;
   a shape memory metal actuator element coupled between the louvers and the housing to move the louvers into the open position when the actuator element is heated;
   means for automatically heating the actuator element only when the light source is activated such that the louvers are automatically opened by the actuator element after the light source is activated, and the louvers are automatically closed by the spring after the light source is de-activated; and
   a resilient overload protection spring coupled between the actuator element and the louvers to transmit louver opening forces developed by the actuator element to the louvers, said overload protection spring having a spring force sufficiently high to transmit said opening forces to the louvers and sufficiently low to protect the actuator element from excessive stretching forces transmitted to the overload protection spring by the louvers.

6. The invention of claim 5 wherein the heating means comprises means for passing electrical current through the actuator element when the light source is activated in order to heat the actuator element resistively.

7. The invention of claim 6 wherein the current passing means comprises means for connecting the actuator element in series with the light source.

8. The invention of claim 5 wherein the heating means comprises:
means for mounting the actuator element adjacent the light source such that heat generated by the light source when activated heats the actuator element.

9. The invention of claim 8 wherein the actuator element mounting means operates to mount the actuator element above the light source.

10. In a lamp comprising a lamp housing, a light source and a lens, the improvement comprising:
an array of elongated louvers, each defining a blade and a pivot axis positioned centrally at each end of the blade;
means for pivotably securing each of the louvers to the housing such that the louvers are oriented parallel to one another in front of the lens to pivot about their respective pivot axes;
a bar extending perpendicular to the pivot axes and pivotably connected to each louver;
a spring mounted between the bar and the housing to bias the bar in a first direction aligned with the bar and thereby to bias the louvers into a closed position in which the louvers substantially cover the lens;
a shape memory metal actuator element mounted between the bar and the housing to move the bar in a second direction, opposed to the first direction, when heated above a selected temperature, thereby moving the louvers into an open position in which the louver blades are oriented perpendicularly to the lens to reveal the lens;
means for passing electrical current through the actuator element to resistively heat the actuator element only when the light source is activated, said electrical current effective to heat the actuator element to a temperature above the selected temperature such that the actuator element automatically moves the louvers to the open position after the light source is activated and the spring automatically moves the louvers to the closed position after the light source is deactivated; and
a resilient overload spring mounted between the actuator element and the bar to transmit louver opening forces developed by the actuator element to the bar, said overload protection spring having a spring force sufficiently high to transmit said opening forces to the bar and sufficiently low to protect the actuator element from excessive stretching forces transmitted to the overload protection spring by the bar.

11. The invention of claim 10 wherein the current passing means comprises means for placing the actuator element in series with the light source.

12. The invention of claim 10 wherein the actuator element comprises a shape memory metal wire configured in the shape of a coil spring.

13. In a lamp comprising a lamp housing, a light source and a lens, the improvement comprising:
an array of elongated louvers, each defining a blade and a pivot positioned centrally at each end of the blade;
means for pivotably securing each of the louvers to the housing such that the louvers are oriented parallel to one another in front of the lens to pivot about their respective pivots;
a bar extending perpendicular to the louvers and pivotably connected to each louver;
a bracket fixedly mounted to the housing, said bracket defining a pivot axis and an attachment point;
a lever arm mounted to pivot about the pivot axis, said arm defining first and second ends on respective sides of the pivot axis;
means for connecting the first end of the lever arm to the bar such that pivotal movement of the lever arm about the pivot axis causes the bar to move the louvers between an open position, in which the louver blades are perpendicular to the lens to reveal the lens, and a closed position, in which the louver blades are substantially parallel to the lens to cover the lens;
a shape memory metal wire connected between the attachment point and the second end of the lever arm such that variations in the length of the wire cause the lever arm to pivot about the pivot axis, said bracket and lever arm configured such that the wire is positioned adjacent to the light source and heat generated by the light source when activated causes the wire to contract to pivot the lever arm so as to move the louvers into the open position;
a spring coupled to the bar to bias the louvers to the closed position when the light source is deactivated; and
an overload protection spring included in the connecting means to transmit louver opening forces developed by the shape memory metal wire to the bar, said overload protection spring having a spring force sufficiently high to transmit said opening forces to the bar and sufficiently low to protect the shape memory metal wire from excessive stretching forces applied to the overload protection spring by the bar.

14. The invention of claim 13 wherein the spring comprises a leaf spring mounted to bear against the lever arm.

15. The invention of claim 13 wherein the overload protection spring comprises a strip of spring steel having a stiffness effective to allow flexing of the strip when excessive forces are applied to the louvers, thereby protecting the wire from over-extension.

16. The invention of claim 1 wherein the overload protection element comprises a spring.

17. The invention of claim 16 wherein the spring comprises a flexible metallic strip.

18. The invention of claim 5 wherein the spring comprises a flexible metallic strip.

* * * * *